(12) United States Patent
Shi et al.

(10) Patent No.: US 10,439,990 B2
(45) Date of Patent: *Oct. 8, 2019

(54) SYSTEM AND METHOD TO CONFIGURE A FIREWALL FOR ACCESS TO A CAPTIVE NETWORK

(71) Applicant: BARRACUDA NETWORKS, INC., Campbell, CA (US)

(72) Inventors: Fleming Shi, Scotts Valley, CA (US); Gean Han, San Jose, CA (US)

(73) Assignee: Barracuda Networks, Inc., Campbell, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/031,963

(22) Filed: Jul. 10, 2018

(65) Prior Publication Data

US 2018/0324144 A1 Nov. 8, 2018

Related U.S. Application Data

(63) Continuation-in-part of application No. 15/222,794, filed on Jul. 28, 2016, now Pat. No. 10,044,677.

(60) Provisional application No. 62/260,111, filed on Nov. 25, 2015.

(51) Int. Cl.
| | |
|---|---|
| *H04L 29/06* | (2006.01) |
| *H04L 12/46* | (2006.01) |
| *H04L 12/66* | (2006.01) |
| *H04W 84/12* | (2009.01) |
| *H04L 12/911* | (2013.01) |

(52) U.S. Cl.
CPC ........ *H04L 63/029* (2013.01); *H04L 12/4633* (2013.01); *H04L 12/4641* (2013.01); *H04L 12/66* (2013.01); *H04L 63/0263* (2013.01); *H04L 63/0272* (2013.01); *H04L 63/1408* (2013.01); *H04L 47/825* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 7,730,527 B2 | 6/2010 | Charles et al. | |
| 7,797,530 B2 * | 9/2010 | Moineau | H04L 63/0227 713/153 |
| 8,644,799 B2 | 2/2014 | Rui et al. | |
| 8,750,825 B2 | 6/2014 | Patterson et al. | |

(Continued)

*Primary Examiner* — Christopher A Revak

(57) ABSTRACT

An approach is proposed that contemplates system and method to configure firewall rules of a VPN gateway of a protected network so that users of devices in the protected network can access Internet securely via a captive network. First, the proposed approach enables the VPN gateway to probe the captive network with an HTTP request to discover a captive portal of the captive network. After the captive portal is discovered, one or more firewall rules of the VPN gateway are added so that network traffic from the devices in the protected network are redirected to the captive portal for authentication. Once the users are authenticated and a VPN tunnel is established between the VPN gateway and a remote VPN tunnel terminal, the firewall rules previously added are removed from the VPN gateway and all network traffic from the devices in the protected network are routed over the VPN tunnel.

29 Claims, 5 Drawing Sheets

(56) References Cited

U.S. PATENT DOCUMENTS

| | | |
|---|---|---|
| 8,813,168 B2 | 8/2014 | Riley et al. |
| 9,510,371 B2 | 11/2016 | Yu et al. |
| 9,717,019 B2 | 7/2017 | Duan et al. |
| 9,826,464 B2 | 11/2017 | Visuri et al. |
| 10,044,677 B2 * | 8/2018 | Black .................. H04L 63/0263 |
| 2006/0187855 A1 | 8/2006 | Booth, III et al. |
| 2016/0006641 A1 | 1/2016 | Wiggs et al. |
| 2016/0095153 A1 | 3/2016 | Chechani et al. |
| 2016/0269380 A1 | 9/2016 | Kishida |
| 2018/0041943 A1 | 2/2018 | Visuri et al. |

* cited by examiner

SYSTEM AND METHOD TO CONFIGURE A FIREWALL FOR ACCESS TO A CAPTIVE NETWORK

CROSS-REFERENCE TO RELATED APPLICATIONS

This application is a continuation-in-part of U.S. patent application Ser. No. 15/222,794, filed Jul. 28, 2016, entitled "System and Method to Configure a Firewall for Access to a Captive Network", which claims the benefit of U.S. Provisional Patent Application No. 62/260,111, filed Nov. 25, 2015, entitled "Method to Configure a Firewall in Response to Captive Networks". Both applications are incorporated herein in their entireties by reference.

BACKGROUND

Captive Wi-Fi networks, also referred to as "subscription" or "Wi-Fi Hotspot" networks, are public Wi-Fi networks that users can subscribe to or pay to access. Captive Wi-Fi networks can typically be found at public locations including but not limited to coffee shops, Internet cafes, hotels, airports, airplane, and other public or semi-public locations. In some cases, captive networks are sponsored and maintained by wireless carriers (such as AT&T wireless hotspots in Starbucks).

Users/visitors typically access a captive network via its captive portal, which provides a mechanism to control Internet access by authenticating and/or authorizing guest or other types of access to the captive network by the users. When a new user attempts to connect to the Internet through a wireless connection to the captive network, that connection request is sent to the captive portal, which typically presents welcome information and an agreement on terms and conditions of access (allowed ports, liability, etc.) to the captive network for the user to accept. When authentication through the captive portal is complete, the user is allowed access to the Internet through the captive network. In some embodiments, the captive portal may also be used to monetize the user's access to the Internet (as in contemporary airplane Wi-Fi) by facilitating payment for the Internet service. Some mobile devices such as smartphones and laptops can automatically detect that they are within a captive network and display a notification to the user of a smartphone that access must be authorized before connections are allowed to continue.

When an interstitial network appliance such as a virtual private network (VPN) gateway running on a network appliance that has no external display attempts to connect to and use a captive network, utilizing a captive portal that requires interaction via a display screen for access authorization may be problematic. The VPN gateway of the network appliance is typically used to as gatekeeper to protect devices in a protected network. Generally the VPN gateway must be bypassed in an insecure way so that a device protected by the VPN gateway can interact with the captive portal via a web browser or similar web access tool. Otherwise, network access to the captive network by the devices in the protected network cannot be achieved. Bypassing the VPN gateway, however, lowers the security of the devices that the VPN gateway is intended to protect.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF EMBODIMENTS

Figure 1:
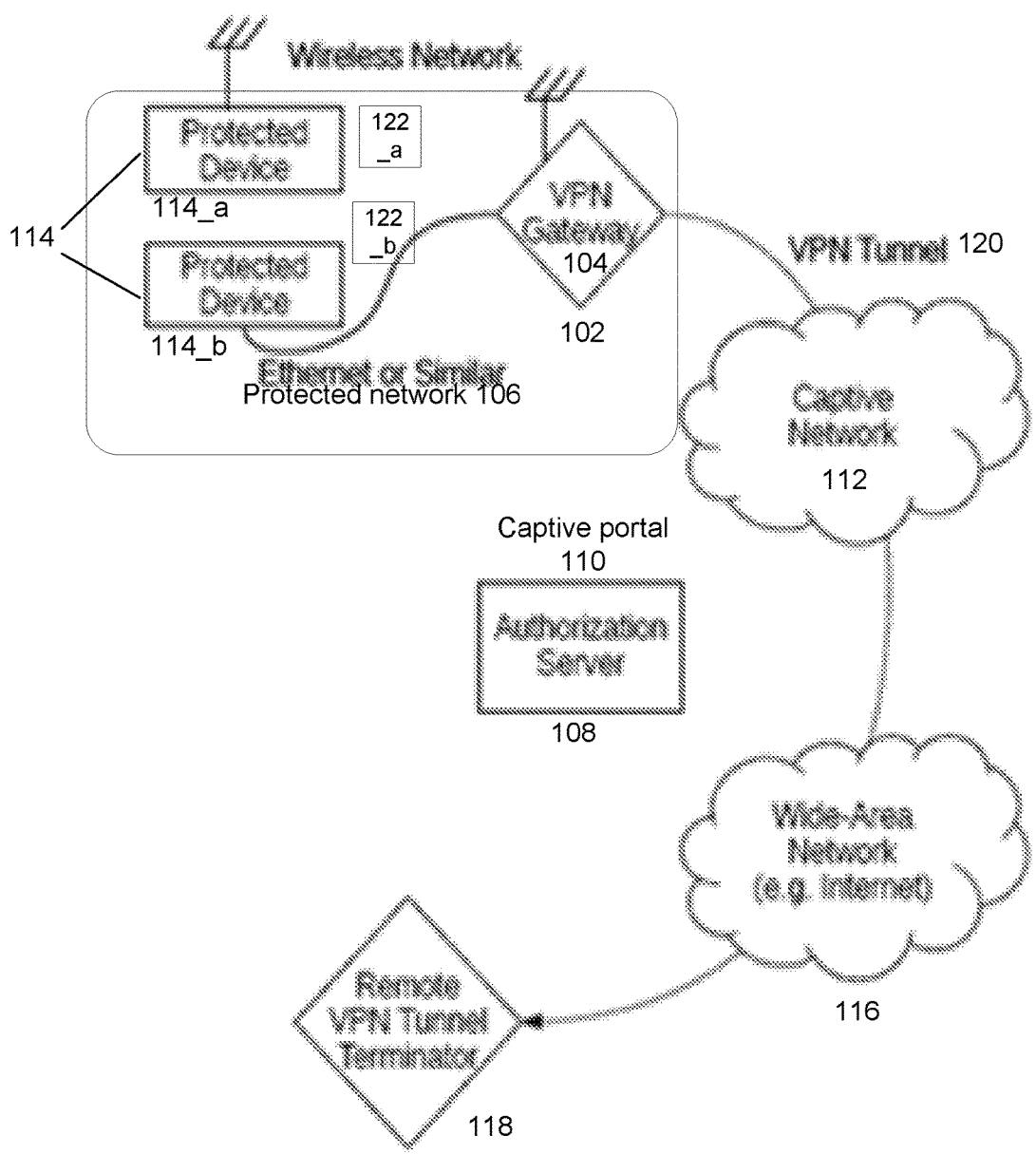
FIG. 1 depicts an example of a system diagram to dynamic firewall configuration for Internet access through a captive network in accordance with some embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. The approach is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

A new approach is proposed that contemplates system and method to configure firewall rules of a VPN gateway of a protected network so that users of devices in the protected network can access Internet securely via a captive network. First, the proposed approach enables the VPN gateway to probe the captive network with an HTTP request to discover and identify a captive portal on an authentication server of the captive network. After the captive portal is discovered, one or more firewall rules of the VPN gateway are added so that network traffic from the devices in the protected network are redirected to the captive portal for authentication. Once the users are authenticated and a VPN tunnel is established between the VPN gateway and a remote VPN tunnel terminal, the firewall rules previously added are removed from the VPN gateway and all network traffic from the devices in the protected network are routed over the VPN tunnel.

By reconfiguring the firewall rules of the VPN gateway, the proposed approach allows the devices in the protected network to access certain hosts only such as the captive portal on the authentication server before the VPN tunnel is established. As such, exposure of the devices/hosts in the protected network (i.e., attackable surface area of any devices in the protected network) to the public network at large is minimized, leading to improved security for the devices in the protected network while still enabling the VPN tunnel to be established for routing of all network traffic from the protected network.

FIG. 1 depicts an example of a system diagram 100 to support dynamic firewall configuration for Internet access through a captive network. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1, the system 100 includes at least a network appliance 102 serving as a VPN gateway 104 for a protected network 106, and an authorization server 108 providing and running a captive portal 110 associated with a captive network 112. Here, the network appliance 102 is hardware-based, software-programmable, e.g., rules for the firewall of the VPN gateway 104 can be programmed and configured by software at runtime. Here, the network appliance 102 can be but is not limited to an x86 or ARM based device with multiple wireless and/or Ethernet interfaces. In some embodiments, the network appliance 102 can be a multi-core embedded hardware module/processor or a single System-on-Chip (SoC) chip comprising one or more of coprocessors (not shown), a memory (also referred to as primary memory, not shown) such as RAM, and a storage unit (not shown) such as a non-volatile memory (also referred to as secondary memory) with software instructions stored in for practicing one or more processes.

In the example of FIG. 1, the VPN gateway 104 of the network appliance 102 is configured to protect a plurality of devices 114 in the protected network 106 by enabling network traffic from the devices 114 to be routed based on rules of its firewall for secured communication and access to the Internet. Here, each of the devices 114 can be either wireless or wired. A wireless protected device, such as 114_a, can be but is not limited to a mobile phone (e.g., a smartphone) or a tablet such as an iPhone, an iPad, a Google's Android-based device, a laptop PC, or any mobile computing and/or communication device. A wired protected device, such as 114_b, can be but is not limited to a desktop PC, a fixed-use device (such as an industrial control device or a bank ATM), or any wired computing and/or communication device. The devices 114 in the protected network 106 are configured to connect to the VPN gateway 104 via a communication network following certain communication protocols, such as TCP/IP protocol. Here, the communication network can be but are not limited to, Internet, intranet, wide area network (WAN), local area network (LAN), wireless network, Bluetooth, WiFi, and mobile communication network. The physical connections of the network and the communication protocols are well known to those of skill in the art.

As discussed above, the captive network 112 in FIG. 1 is a public or semi-public Wi-Fi network that users can subscribe to or pay to gain Wi-Fi access at a public location. A user that intends to access the captive network 112 needs to be authenticated by the captive portal 110 on the authorization server 108 first, wherein the user may communicate with the captive portal 110 interactively via a web browser on his/her associated computing/communicating device. The VPN gateway 104 is also configured to communicate with and access the captive network 112 over a communication network as discussed above.

Figure 2B:
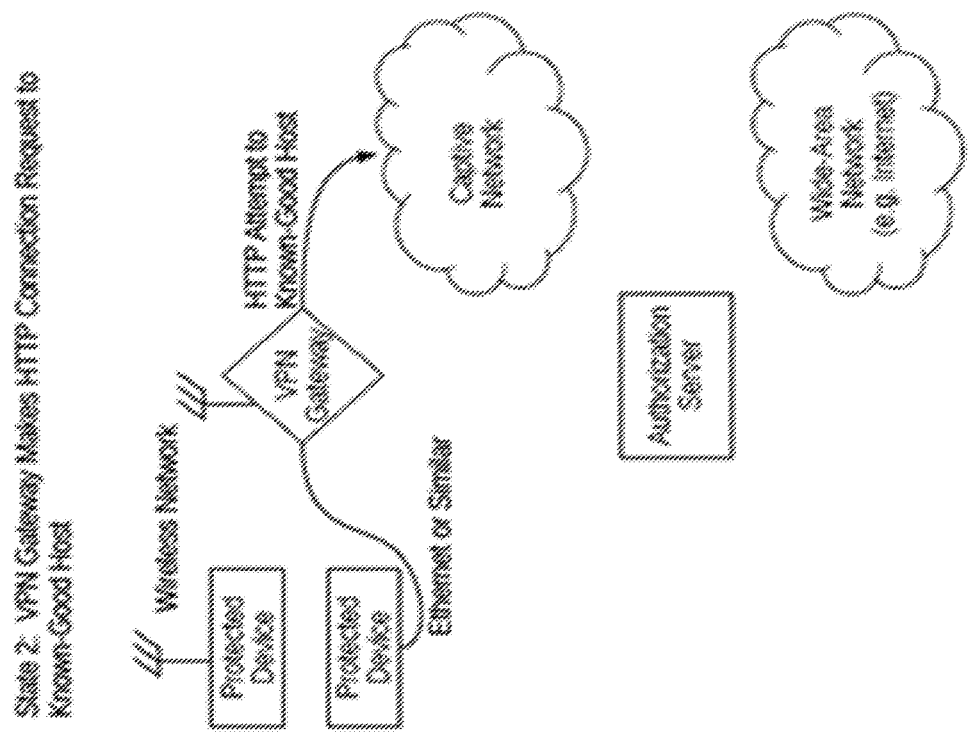
FIGS. 2(a)-(f) depict examples of steps taken by the system in FIG. 1 to route network traffic from the devices in the protected network to the Internet in accordance with some embodiments.
Figure 2A:
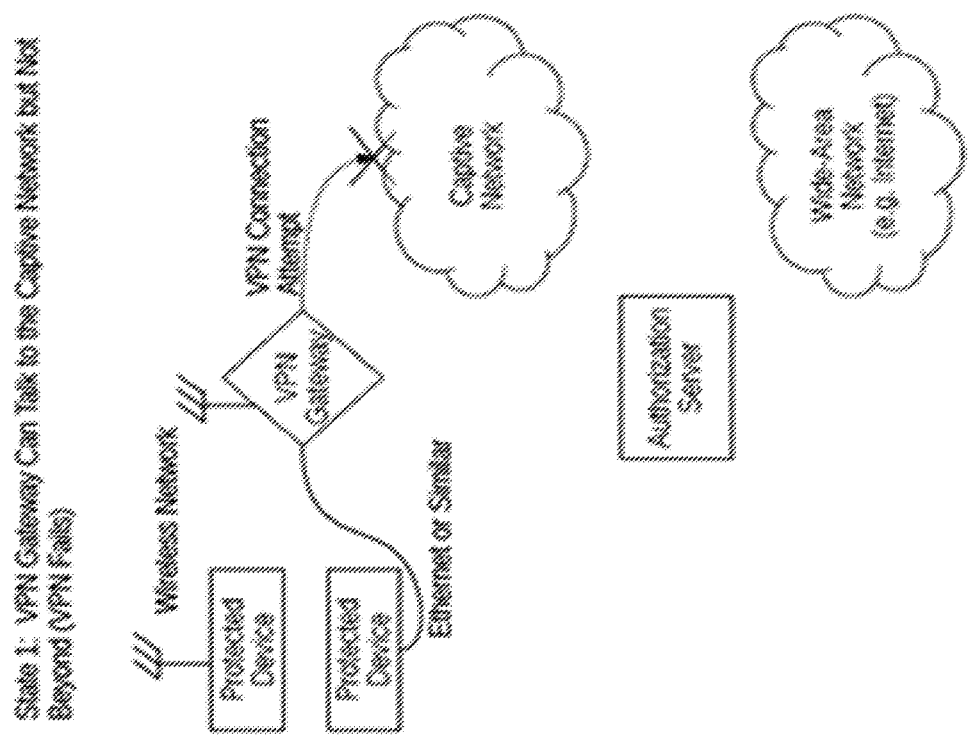
Figures 2C, 2D:
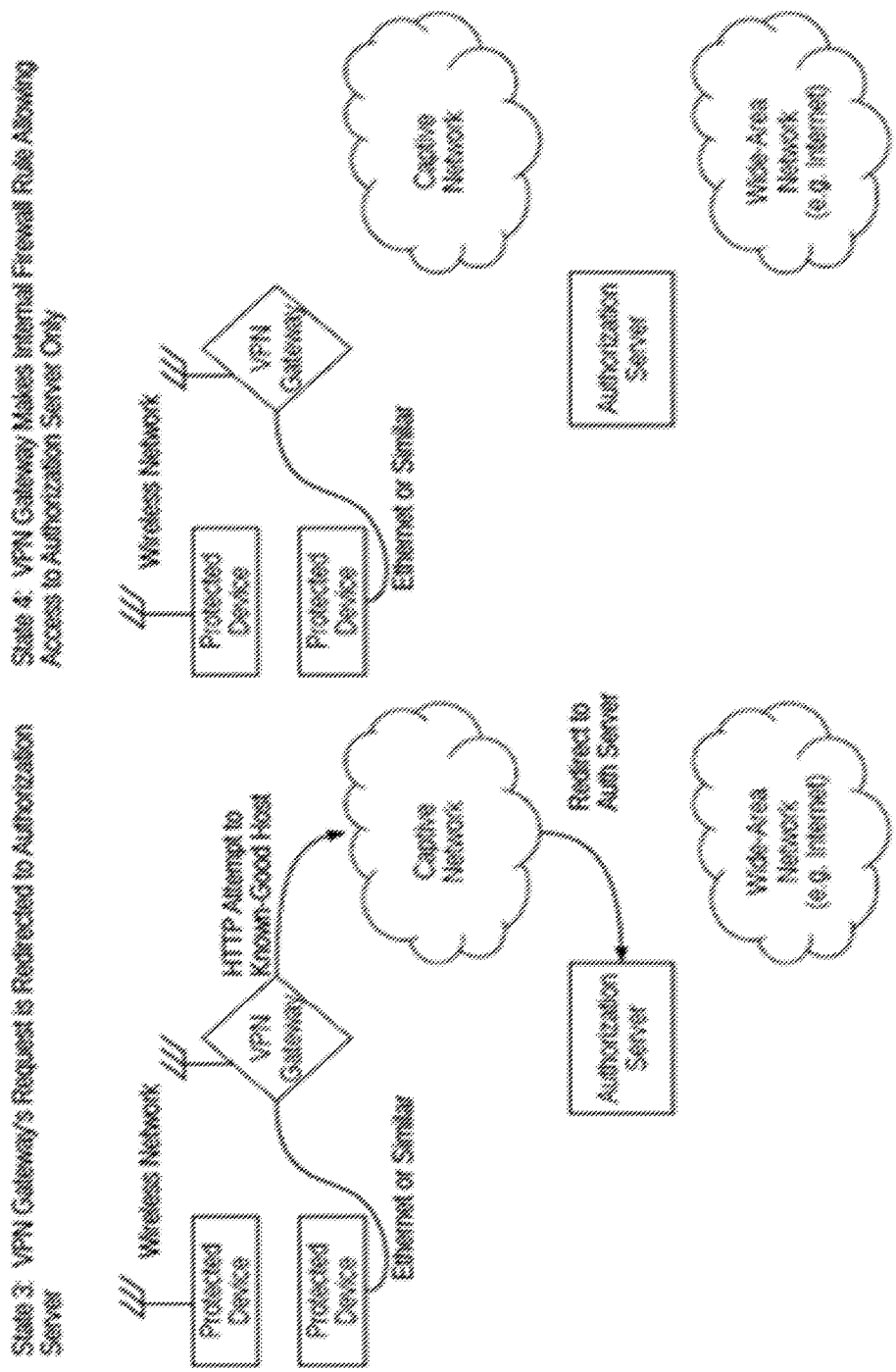

FIGS. 2(a)-(f) depict examples of steps taken by the system 100 in FIG. 1 to route network traffic from the devices 114 in the protected network 106 to the Internet. In the example of FIG. 2(a), the VPN gateway 104 running on the network appliance 102 may first attempt to establish a VPN tunnel through the captive network 112 for secured Internet access by the devices 114 in the protective network 106. When (and only when) such attempt fails, i.e., the VPN tunnel cannot be established because the VPN gateway 104 can only connect to the captive network 112 but not beyond due to the configuration of the captive network. In some embodiments, the VPN gateway 104 is configured to automatically initiate an HTTP request to a known-good/working Internet host, e.g., barracuda.com or one that is set by a user, in order to discover the captive portal 110 as shown in FIG. 2(b). Upon receiving the HTTP request to the known-good host from the VPN gateway 104, the captive network 112 is configured to redirect the HTTP request to its captive portal 110 on the authorization server 108 as shown in FIG. 2(c). As a result of the redirection, the VPN gateway 104 is able to discover the captive portal 110 of the captive network 112.

As shown in the example of FIG. 2(d), once the captive portal 110 is discovered, the VPN gateway 104 is configured to add one or more firewall rules to allow network traffic from devices 114 in the protected network 106 to be automatically routed to the captive portal 110 and only the captive portal 110 for authentication, wherein the captive portal 110 is identified by one or more of IP address, DNS name, or some other combination of attributes of the authorization server 108. Following the change of the firewall rules on the VPN gateway 104, user(s) of the devices 114 in the protected network 106 who attempt to access the Internet via web browser(s) on their devices 114 are redirected to the captive portal 110 of the authorization server 108 for authorization instead as shown in the example of FIG. 2(e). In some embodiments, the VPN gateway 104 is configured to conduct certain form of virus or malware scanning of all network traffic that comes to the captive portal 110.

In some embodiments, the VPN gateway 104 is configured to pre-scan the captive portal 110 for specific URLs allowed to be accessed by the devices 114 in the protected network 106 for authentication/authorization process (undiscovered URLs are not authorized). In some embodiments, the VPN gateway 104 is configured to include and utilize one or more templates to identify one or more commonly-used captive portals 110 (to allow only specific URL requests from the devices 114 but not others that could be man-in-the-middle or similar attacks). In some embodiments, the VPN gateway 104 is configured to capture and optionally replay the communication/conversation of the devices 114 in the protected network 106 with the captive portal 110 in case this same captive portal 110 is seen again (or in case legal or security auditing is needed).

In some embodiments, the one or more templates utilized by the VPN gateway 104 to identify the one or more commonly-used captive portals 110 are artificial intelligence (AI)-driven, wherein the templates predict the captive portals 110 allowed and/or authorized to be accessed by the devices 114 based on intelligence derived from sensory data collected from a variety of network environment sensors 122 about the protected devices 114 and/or their users. Here, each network environment sensor 122 (e.g., 122_a and 122_b) is configured to track one or more of properties, features and behaviors of one or more of the protected devices, e.g., 114_a and 114_b, respectively, which are to be authorized to access the captive portals 110. Each network environment sensor 122 can either be a separate or integrated component associated with a protected device 114. In some embodiments, the sensory data collected by the network environment sensors 122 about each of the protected devices 114 and/or its user includes but is not limited to Wi-Fi hotspot search pattern and/or MAC address of the protected device 114. In some embodiments, the sensory data may be further collected by other mobile devices associated with the user of the protected device 114, e.g., a mobile phone/device of the user and/or any device of the user that emits/transmits radio frequency (RF) (e.g., Bluetooth) signals.

Once the sensory data related to the protected devices 114 and/or their users has been collected; the VPN gateway 104 running on the network appliance 102 is configured to create and include a set of AI logic predicative of access control of the protected devices 114 in the form of, e.g., the one or more templates, based on the sensory data collected. The VPN gateway 104 is then configured to automatically identify, authorize and track the protected devices 114 and their users in the wireless network based on the AI-driven predicative templates. Such AI-driven predicative access control simplifies the experiences of the users of the protected devices 114 by enabling them to be authorized to access the captive portal 110 automatically.

In some embodiments, the VPN gateway 104 is configured to allow only one designated "insecure" host/device 114 in the protected network 106 to access the captive portal 110 before a VPN tunnel is established in order to leave the rest of the devices 114 in the protected network 106 secure, wherein such designated insecure device 114 can be but is not limited to a specific laptop in the protected network 106. In some embodiments, the VPN gateway 104 may allow the user to designate and confirm the insecure device 114 via, for a non-limiting example, an interstitial page of "is it OK to connect to this insecure host?" before adding the firewall rules.

If the user from the protected network 106 is authenticated by the authorization server 108, a VPN tunnel 120 can be established between the VPN gateway 104 and a remote VPN tunnel terminal point/terminator 118 through the captive network 112 and a wide area network (WAN) 116, e.g., the Internet, wherein every component/device behind the VPN tunnel terminal point/terminator 118 routes its traffic over the VPN tunnel 120. In some embodiments, the VPN tunnel terminal point 118 can be but is not limited to a generic firewall, a custom-built VPN appliance such as SSL VPN, or built into a generic routing device. It can be either in the form of a virtual machine (VM) or it can be a hardware device (e.g., either a generic PC-style server or a customized device with acceleration hardware). In some embodiments, the VPN tunnel terminal point 118 can also be either an aggregation device, which for a non-limiting example, can be a high-performance connection aggregator implemented in a standard or modified firewall as either a physical server or VM. Alternatively, the VPN tunnel terminal point 118 may instead be a device intended to forge a symmetrical point-to-point connection with another device similar to the VPN gateway 104.

Figure 2F:
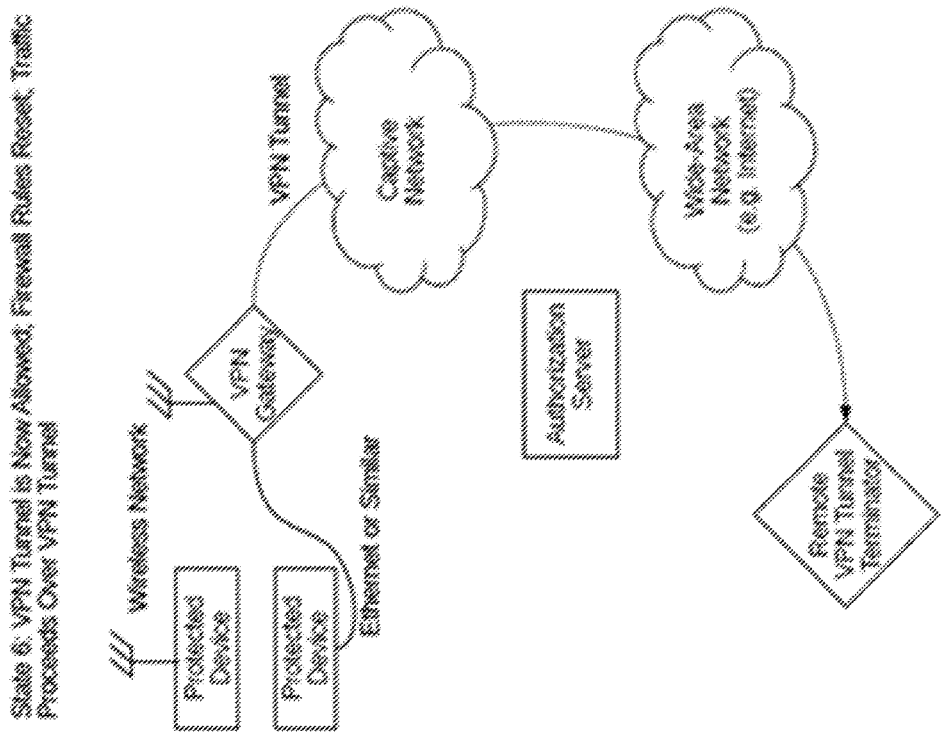
Figure 2E:
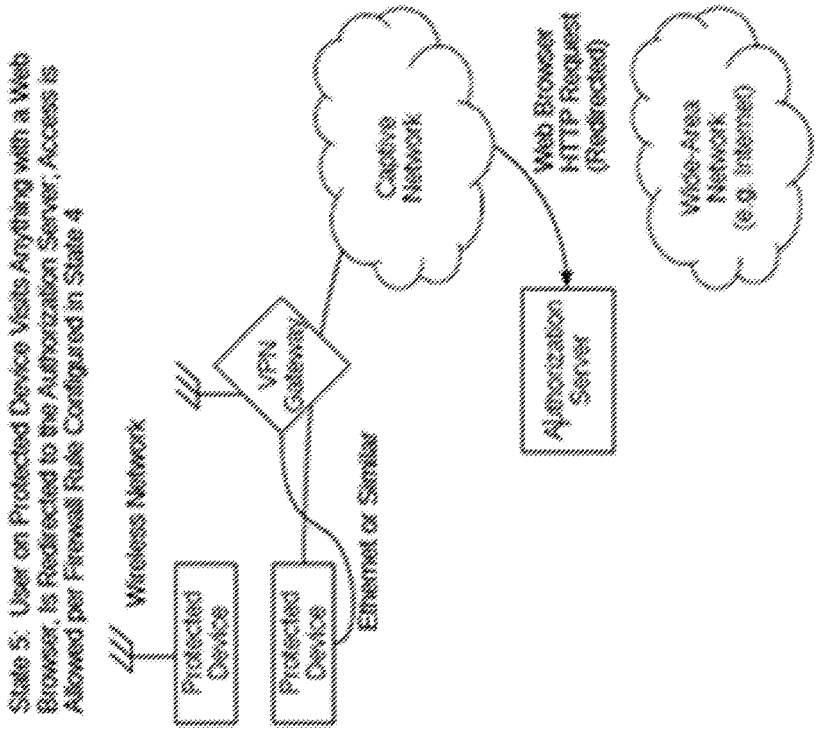

Once the VPN tunnel is established, the VPN gateway 104 is configured to remove the firewall rules previously added (to redirect the network traffic from the protected network 106 to the captive portal 110) so that all network traffic from the devices 114 in the protected network 106 is routed thereafter over the VPN tunnel 120 as shown in the example of FIG. 2(f). In some embodiments, the VPN gateway 104 is configured to allow the captive portal 110 to continue communication to only the device 114 that has been authenticated after the VPN tunnel has been established so that information such as timers or other accounting data can be displayed.

Figure 3:
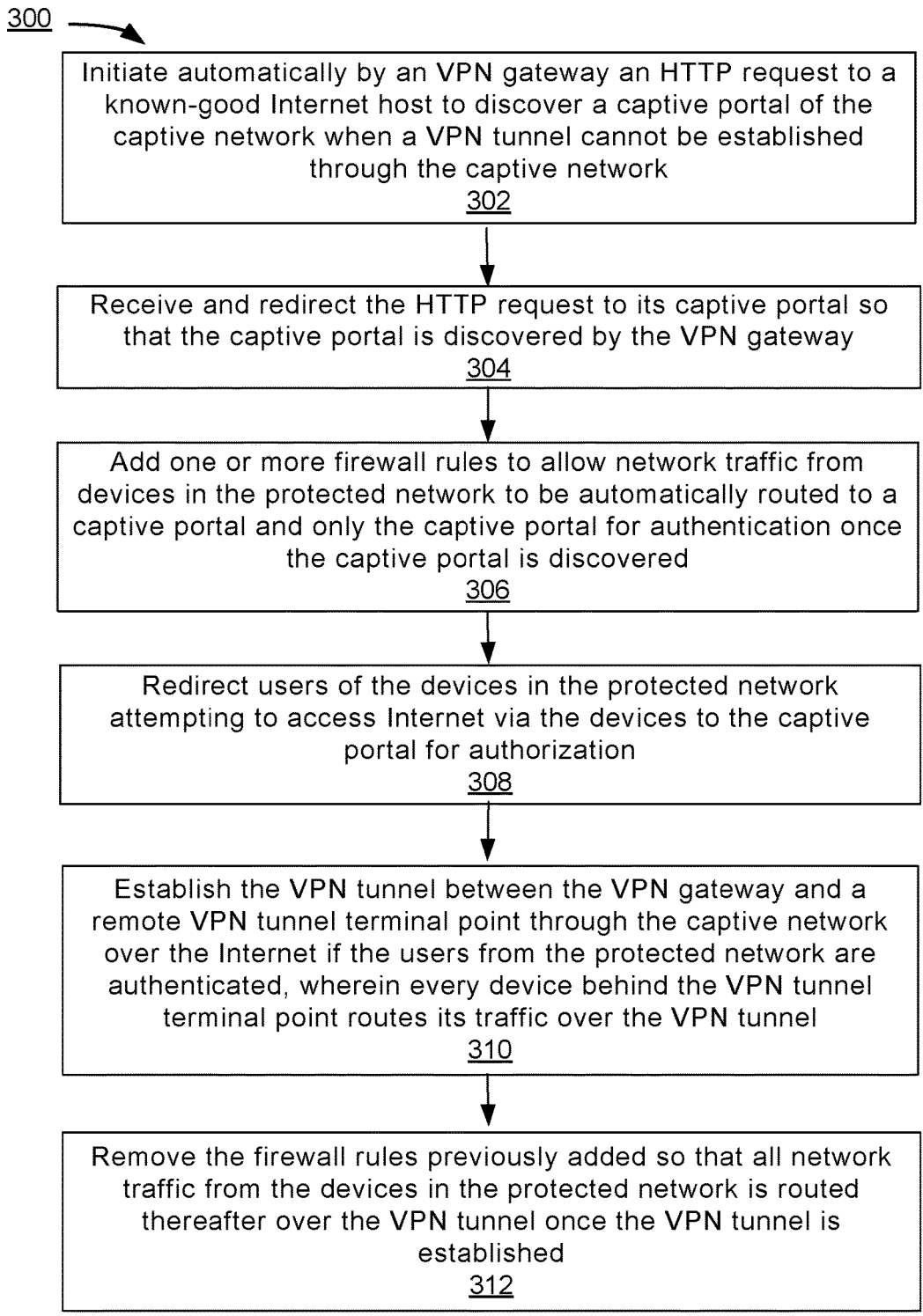
FIG. 3 depicts a flowchart of an example of a process to support dynamic firewall configuration for Internet access through a captive network in accordance with some embodiments.

FIG. 3 depicts a flowchart 300 of an example of a process to support dynamic firewall configuration for Internet access through a captive network. Although the figure depicts functional steps in a particular order for purposes of illustration, the processes are not limited to any particular order or arrangement of steps. One skilled in the relevant art will appreciate that the various steps portrayed in this figure could be omitted, rearranged, combined and/or adapted in various ways.

In the example of FIG. 3, the flowchart 300 starts at block 302, where an HTTP request to a known-good Internet host is automatically initiated by an VPN gateway of a protected network to discover a captive portal of a captive network when a VPN tunnel cannot be established through the captive network. The flowchart 300 continues to block 304, where the HTTP request received by the captive network is redirected to its captive portal so that the captive portal is discovered by the VPN gateway. The flowchart 300 continues to block 306, where one or more firewall rules are added to allow network traffic from devices in the protected network to be automatically routed to the captive portal and only the captive portal for authentication once the captive portal is discovered. The flowchart 300 continues to block 308, where users of the devices in the protected network attempting to access Internet via web browsers on the devices are redirected to the captive portal for authorization. The flowchart 300 continues to block 310, where a VPN tunnel is established between the VPN gateway and a remote VPN tunnel terminal point through the captive network over the Internet if the users from the protected network are authenticated, wherein every device behind the VPN tunnel terminal point routes its traffic over the VPN tunnel. The flowchart 300 ends at block 312 where the firewall rules previously added are removed so that all network traffic from the devices in the protected network is routed thereafter over the VPN tunnel once the VPN tunnel is established.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

The methods and system described herein may be at least partially embodied in the form of computer-implemented processes and apparatus for practicing those processes. The disclosed methods may also be at least partially embodied in the form of tangible, non-transitory machine readable storage media encoded with computer program code. The media may include, for example, RAMs, ROMs, CD-ROMs, DVD-ROMs, BD-ROMs, hard disk drives, flash memories, or any other non-transitory machine-readable storage medium, wherein, when the computer program code is loaded into and executed by a computer, the computer becomes an apparatus for practicing the method. The methods may also be at least partially embodied in the form of a computer into which computer program code is loaded and/or executed, such that, the computer becomes a special purpose computer for practicing the methods. When implemented on a general-purpose processor, the computer program code segments configure the processor to create specific logic circuits. The methods may alternatively be at least partially embodied in a digital signal processor formed of application specific integrated circuits for performing the methods.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments and with various modifications that are suited to the particular use contemplated.

What is claimed is:

1. A system to support dynamic firewall configuration for Internet access through a captive network, comprising:
    a network appliance serving as an VPN gateway of a protected network and configured to
        create and utilize one or more templates to identify a set of commonly-used captive portals to allow only URL requests from one or more devices in the protected network to access;
        add one or more firewall rules to allow network traffic from the one or more devices in the protected network to be automatically routed to one of the commonly-used captive portals once the captive portals are identified;
        redirect users of the one or more devices in the protected network attempting to access Internet via the devices to the captive portal;
        establish a VPN tunnel between the VPN gateway and a remote VPN tunnel terminal point through the captive network over the Internet, wherein every device behind the VPN tunnel terminal point routes its traffic over the VPN tunnel;
        remove the firewall rules previously added so that all network traffic from the devices in the protected network is routed thereafter over the VPN tunnel once the VPN tunnel is established.

2. The system of claim 1, wherein:
the captive network is a public Wi-Fi network that the users subscribe to or pay to access at a public location.

3. The system of claim 1, wherein:
the network appliance is an x86 or ARM based device that is programmable, wherein the firewall rules are adjustable at runtime.

4. The system of claim 1, wherein:
the captive portal is identified by one or more of IP address, DNS name, and a combination of attributes of an authorization server that runs the captive portal.

5. The system of claim 1, wherein:
the VPN gateway is configured to conduct virus or malware scanning of all network traffic that comes to the captive portal.

6. The system of claim 1, wherein:
the VPN gateway is configured to pre-scan the captive portal for specific URLs allowed to be accessed by the devices in the protected network.

7. The system of claim 1, wherein:
the one or more templates utilized by the VPN gateway to identify the commonly-used captive portals are artificial intelligence (AI)-driven, wherein the templates predict the captive portals allowed and/or authorized to be accessed by the devices based on intelligence derived from sensory data collected from a variety of network environment sensors about the devices and/or their users.

8. The system of claim 7, wherein:
each of the network environment sensors is configured to track one or more of properties, features and behaviors of one or more of the devices to be authorized to access the captive portal.

9. The system of claim 7, wherein:
each of the network environment sensors is either be a separate or integrated component associated with one of the devices.

10. The system of claim 7, wherein:
the sensory data collected by the network environment sensors about each of the devices and/or its user includes Wi-Fi hotspot search pattern and/or MAC address of the device.

11. The system of claim 7, wherein:
the sensory data is further collected by another mobile device associated with a user of one of the devices, wherein the another mobile device transmits radio frequency (RF) signals.

12. The system of claim 7, wherein:
the VPN gateway is configured to include a set of AI logic predicative of access control of the devices in the one or more templates based on the sensory data collected.

13. The system of claim 12, wherein:
the VPN gateway is configured to automatically identify, authorize and track the devices and their users based on the AI-driven predicative templates.

14. The system of claim 1, wherein:
the VPN gateway is configured to capture and replay communication of the devices with the captive portal in case the same captive portal is visited again.

15. The system of claim 1, wherein:
the VPN gateway is configured to allow only one designated device in the protected network to access the captive portal before the VPN tunnel is established in order to leave rest of the devices in the protected network secure.

16. The system of claim 15, wherein:
the VPN gateway is configured to allow the captive portal to continue communication to only the designated device after the VPN tunnel has been established.

17. A method to support dynamic firewall configuration for Internet access through a captive network, comprising:
    creating and utilizing one or more templates to identify a set of commonly-used captive portals to allow only URL requests from one or more devices in the protected network;
    adding one or more firewall rules to allow network traffic from the one or more devices in the protected network to be automatically routed to one of the commonly-used captive portals for authentication once the captive portals are identified;
    redirecting users of the one or more devices in the protected network attempting to access Internet via the devices to the captive portal;
    establishing a VPN tunnel between the VPN gateway and a remote VPN tunnel terminal point through the captive network over the Internet, wherein every device behind the VPN tunnel terminal point routes its traffic over the VPN tunnel;

removing the firewall rules previously added so that all network traffic from the devices in the protected network is routed thereafter over the VPN tunnel once the VPN tunnel is established.

18. The method of claim 17, wherein:

the VPN gateway runs on a programmable network appliance, wherein the firewall rules are adjustable at runtime.

19. The method of claim 17, further comprising:

identifying the captive portal by one or more of IP address, DNS name, and a combination of attributes of an authorization server that runs the captive portal.

20. The method of claim 17, further comprising:

conducting virus or malware scanning of all network traffic that comes to the captive portal.

21. The method of claim 17, further comprising:

pre-scanning the captive portal for specific URLs allowed to be accessed by the devices in the protected network for authentication.

22. The method of claim 17, wherein:

the one or more templates utilized to identify the commonly-used captive portals are artificial intelligence (AI)-driven, wherein the templates predict the captive portals allowed and/or authorized to be accessed by the devices based on artificial intelligence derived from sensory data collected from a variety of network environment sensors about the devices and/or their users.

23. The method of claim 22, further comprising:

tracking one or more of properties, features and behaviors of one or more of the devices to be authorized to access the captive portal via the network environment sensors.

24. The method of claim 22, further comprising:

collecting the sensory data by another mobile device associated with a user of one of the devices, wherein the another mobile device transmits radio frequency (RF) signals.

25. The method of claim 22, further comprising:

including a set of AI logic predicative of access control of the devices in the one or more templates based on the sensory data collected.

26. The method of claim 25, further comprising:

automatically identifying, authorizing and tracking the devices and their users based on the AI-driven predicative templates.

27. The method of claim 17, further comprising:

capturing and replaying communication of the devices with the captive portal in case the same captive portal is visited again.

28. The method of claim 17, further comprising:

allowing only one designated device in the protected network to access the captive portal before the VPN tunnel is established in order to leave rest of the devices in the protected network secure.

29. The method of claim 28, further comprising:

allowing the captive portal to continue communication to only the designated device after the VPN tunnel has been established.

* * * * *